US010954318B2

(12) United States Patent
Baran, Jr. et al.

(10) Patent No.: US 10,954,318 B2
(45) Date of Patent: Mar. 23, 2021

(54) POLYMERIZABLE COMPOSITIONS FREE OF ORGANIC EMULSIFIER AND POLYMERS AND METHODS OF MAKING THEREOF

(75) Inventors: Jimmie R. Baran, Jr., Prescott, WI (US); Duane D. Fansler, Dresser, WI (US); Klaus Hintzer, Kastl (DE); William J. Hunt, Afton, MN (US); Harald Kaspar, Burgkirchen (DE); Tilman C. Zipplies, Burghausen (DE)

(73) Assignee: 3M Innovative Properties Company, St. Paul, MN (US)

( * ) Notice: Subject to any disclaimer, the term of this patent is extended or adjusted under 35 U.S.C. 154(b) by 134 days.

(21) Appl. No.: 13/704,064

(22) PCT Filed: Jun. 9, 2011

(86) PCT No.: PCT/US2011/039772
§ 371 (c)(1),
(2), (4) Date: Dec. 13, 2012

(87) PCT Pub. No.: WO2011/162971
PCT Pub. Date: Dec. 29, 2011

(65) Prior Publication Data
US 2013/0090441 A1 Apr. 11, 2013

Related U.S. Application Data

(60) Provisional application No. 61/358,085, filed on Jun. 24, 2010.

(51) Int. Cl.
| | | |
|---|---|---|
| C08F 2/10 | (2006.01) | |
| C08F 2/20 | (2006.01) | |
| C08F 2/22 | (2006.01) | |
| C08K 9/06 | (2006.01) | |
| C08F 14/28 | (2006.01) | |
| C08F 16/24 | (2006.01) | |
| C08F 14/26 | (2006.01) | |
| C08F 2/18 | (2006.01) | |
| C08K 3/36 | (2006.01) | |

(52) U.S. Cl.
CPC .............. *C08F 2/10* (2013.01); *C08F 2/18* (2013.01); *C08F 2/20* (2013.01); *C08F 2/22* (2013.01); *C08F 14/26* (2013.01); *C08F 14/28* (2013.01); *C08F 16/24* (2013.01); *C08K 9/06* (2013.01); *C08K 3/36* (2013.01); *C08K 2201/011* (2013.01)

(58) Field of Classification Search
CPC .......... C08F 2/18; C08F 2/22; C08F 2/16–32; C08F 14/26; C08F 14/28; C08F 16/24; C08K 3/36; C08K 9/06; C08K 2201/011
See application file for complete search history.

(56) References Cited

U.S. PATENT DOCUMENTS

| | | | |
|---|---|---|---|
| 3,068,184 A | 12/1962 | Noorduyn et al. | |
| 3,536,785 A * | 10/1970 | Wilbur ................. | C08F 279/02 525/254 |
| 4,128,517 A | 12/1978 | Kydonieus | |
| 5,037,579 A | 8/1991 | Matchett | |
| 6,166,157 A | 12/2000 | Hung et al. | |
| 6,353,037 B1 | 3/2002 | Thunhorst et al. | |
| 6,432,526 B1 | 8/2002 | Arney et al. | |
| 6,451,941 B1 * | 9/2002 | Urashima et al. ............ 526/212 | |
| 6,461,941 B2 | 9/2002 | Urashima | |
| 6,586,483 B2 | 7/2003 | Kolb et al. | |
| 6,833,403 B1 | 12/2004 | Bladel et al. | |
| 7,094,830 B2 | 8/2006 | Baran et al. | |
| 7,129,277 B2 | 10/2006 | Baran | |
| 7,319,114 B2 | 1/2008 | Ohmura et al. | |
| 7,375,157 B2 | 5/2008 | Amos et al. | |
| 7,476,694 B2 | 1/2009 | Baran et al. | |
| 7,531,595 B2 | 5/2009 | Lewandowski et al. | |
| 7,671,112 B2 | 3/2010 | Hintzer et al. | |
| 2002/0198334 A1 * | 12/2002 | Kaspar ..................... | C08F 2/22 526/78 |
| 2003/0134951 A1 * | 7/2003 | Yamaya .................. | C08J 7/047 524/265 |
| 2005/0200278 A1 * | 9/2005 | Jones ..................... | G02B 5/045 313/582 |
| 2006/0147177 A1 | 7/2006 | Jing et al. | |
| 2006/0204528 A1 * | 9/2006 | Nolte ..................... | B82Y 30/00 424/401 |
| 2008/0069887 A1 * | 3/2008 | Baran .................... | B82Y 30/00 424/490 |

(Continued)

FOREIGN PATENT DOCUMENTS

| | | |
|---|---|---|
| CN | 1557876 | 12/2004 |
| CN | 101104659 | 1/2008 |

(Continued)

OTHER PUBLICATIONS

Partial Translation; JP 1992-233909A (Equivalent of JP 04-233909A); Sakuma; Aug. 1992.*

(Continued)

*Primary Examiner* — Kregg T Brooks
(74) *Attorney, Agent, or Firm* — Julie Lapos-Kuchar

(57) ABSTRACT

Described herein is a polymerizable composition substantially free of an organic emulsifier, methods of making, and articles thereof. The polymerizable composition comprises: a continuous phase; a polymerizable monomer; an initiator; and inorganic nanoparticles, wherein the inorganic nanoparticles are substantially free of groups that will copolymerize with the polymerizable monomer.

13 Claims, No Drawings

(56) References Cited

U.S. PATENT DOCUMENTS

| | | | | |
|---|---|---|---|---|
| 2008/0153975 A1* | 6/2008 | Lubnin | ............ | 524/585 |
| 2009/0048571 A1* | 2/2009 | Catalan | ............ | A61L 15/22 |
| | | | | 604/367 |
| 2010/0021754 A1* | 1/2010 | Schlichting | ............ | C08F 2/22 |
| | | | | 428/512 |

FOREIGN PATENT DOCUMENTS

| | | | | |
|---|---|---|---|---|
| GB | 952352 A * | 3/1964 | ......... | B01F 17/0085 |
| JP | 1992-233909 A | 8/1992 | | |
| JP | 04233909 A * | 8/1992 | ............ | C08F 2/44 |
| JP | H04-233909 | 8/1992 | | |
| JP | 2007-217645 | 8/2007 | | |
| JP | 2007-530727 | 11/2007 | | |
| JP | 2008-133361 | 6/2008 | | |
| JP | 2010-501025 | 1/2010 | | |
| JP | 2010-215685 | 9/2010 | | |
| WO | WO 02/072671 | 9/2002 | | |
| WO | WO 2006/049392 | 5/2006 | | |
| WO | WO 2007/138946 | 12/2007 | | |
| WO | WO 2008/001097 | 1/2008 | | |
| WO | WO 2008071686 A1 * | 6/2008 | ............ | C08F 2/22 |
| WO | WO-2008142383 A1 * | 11/2008 | ......... | B01J 13/0047 |
| WO | WO 2009/044912 | 4/2009 | | |

OTHER PUBLICATIONS

Data for Aerosil; 2010.*
Machine translation of JP 2008-133361.*
Satish Chandra, ed., Waste Materials Used in Concrete Manufacturing, pp. 561-562 (1997).*
Machine translation of JP 2007-217645.*
Van Nostrand's Scientific Encyclopedia Online (2007).*
Knovel Solvents—A Property Database, Styrene (2008).*
CWK Bad Kostritz, Kostrosol Colloidal Silica Web Page ("Kostrosol"), http://www.cwk-bk.de/www/cwken/produkte/kieselsaeure/g5ffnpy6, retrieved Oct. 27, 2016.*
Ianchis et al., "Surfactant-free emulsion polymerization of styrene in the presence of silylated montmorillonite," Applied Clay Science 45, 164-170 (2009).*
AkzoNobel, Bindzil and Levasil colloidal silica (2014).*
Aerosil Brochure, p. 6, Nippon Aerosil Co., Ltd., 2nd Edition (Aug. 2010).
Sorenson, W.R., et al., Preparative Methods of Polymer Chemistry, Third Ed., John Wiley and Sons, Inc. New York, 2001, p. 250 and 273.
PCT International Search Report from PCT/US2011/039772 dated Feb. 22, 2012, 4 pages.
Hu, Jing et al., Properties of acrylic resin/nano-$SiO_2$ leather finishing agent prepared via emulsifier-free emulsion polymerization, ScienceDirect, Materials Letters 62 (2008) 2931-2934.
Yu, Cai-Li, et al., Kinetics of acrylate emulsion polymerization containing hydropihilic hydroxyl monomer in the presence of nano-$SiO_2$ particles, Polymers Advanced Technologies, 2009, 20, 347-350.
Sheibat-Othman, N. et al., "Use of Silica Particles for the Formation of Organic-Inorganic Particles by Surfactant-Free Emulsion Polymerization", Langmuir Article, 2009 American Chemical Society, 25 (17), 10121-10133.
Yu, Cai-Li, et al. "The Effect of Nano-$SiO_2$ Colloid on Soap-Free Emulsion Polymerization of Methyl Methacrylate and Hydroxyethyl Methacrylate", Journal of Macromolecular Science, Part A: Pure and Applied Chemistry (2009), 46, 870-875.

* cited by examiner

POLYMERIZABLE COMPOSITIONS FREE OF ORGANIC EMULSIFIER AND POLYMERS AND METHODS OF MAKING THEREOF

TECHNICAL FIELD

A process for polymerizing polymers in the presence of inorganic nanoparticles is described along with compositions and articles thereof.

BACKGROUND

Suspension and emulsion polymerization are two common techniques for polymerizing polymers. Both of these techniques comprise a continuous phase and a discontinuous phase. During polymerization, emulsifiers may be used to prevent coalescing of the discontinuous phase. After forming the polymer particles, an emulsifier may be used to stabilize the dispersion, preventing the particles from agglomerating and settling.

Traditional emulsifiers are organic-based emulsifiers that may be fluorinated (e.g., partially or fully fluorinated). For example, monomers comprising groups, which generate ions in water, may be incorporated into a polymer. These ions create a charge, which repels the charges on other monomers and polymeric particles, preventing coalescing of the discontinuous phase and agglomeration of the polymeric particles. In another example, a non-ionic surfactant having both hydrophilic and hydrophobic segments can be used as an emulsifier. The hydrophobic and hydrophilic segments orient in water to form a steric barrier that prevents phase coalescence and particle agglomeration. Further, an ionic surfactant comprising the hydrophilic and hydrophobic segments as well as an ionic charge may be used to prevent coalescence and agglomeration via orientation of the hydrophilic and hydrophobic segments as well as through charge repulsion.

In some instances these emulsifiers may have a negative impact on the final product. In these instances, the organic-based emulsifiers are preferably removed. For example, U.S. Pat. No. 3,068,184 (Noorduyn et al.) teaches the removal of residual emulsifier from polyvinyl chloride, while U.S. Pat. Nos. 4,128,517 (Kydonieus); U.S. Pat. No. 6,833,403 (Bladel et al.); and U.S. Pat. No. 7,671,112 (Hintzer et al.) disclose removal of emulsifiers from fluoropolymer dispersions.

SUMMARY

There is a desire for an emulsifying agent that can stabilize the discontinuous phase during polymerization and not cause detrimental effects on the final polymer, which may occur in some applications. There is also a desire for an emulsifying agent that can stabilize the discontinuous phase during polymerization that may offer benefits (e.g., cost) over traditional emulsifiers. There is also a desire for the alternative emulsifying agent to be used at the same or lower concentrations than traditional emulsifiers.

In one aspect, a polymerizable composition is provided comprising: a continuous phase; an amount of inorganic nanoparticles; a polymerizable monomer; and an initiator, wherein the inorganic nanoparticles are substantially free of groups that will copolymerize with the polymerizable monomer and wherein the polymerizable composition is substantially free of an organic emulsifier.

In one embodiment, the amount of inorganic nanoparticles is less than 80,000 ppm.

In another aspect, a dispersion comprising a polymer derived from the polymerizable composition is provided. The polymerizable composition comprising: a continuous phase; an amount of inorganic nanoparticles;; a polymerizable monomer; and an initiator, wherein the inorganic nanoparticles are substantially free of groups that will copolymerize with the polymerizable monomer and wherein the polymerizable composition is substantially free of an organic emulsifier.

In one embodiment of the dispersion, the inorganic nanoparticles are not irreversibly associated with the polymer.

In yet another aspect, an article is provided comprising a polymer derived from a polymerizable composition comprising: a continuous phase; an amount of inorganic nanoparticles; a polymerizable monomer; and an initiator, wherein the inorganic nanoparticles are substantially free of groups that will copolymerize with the polymerizable monomer and wherein the polymerizable composition is substantially free of an organic emulsifier.

In yet another aspect, method is provided comprising: providing a composition comprising a polymerizable monomer, a continuous phase, an initiator, and an inorganic nanoparticle; and polymerizing the composition to form a polymer, wherein the inorganic nanoparticle is substantially free of groups that will copolymerize with the polymerizable monomer and wherein the aqueous solution is substantially free of an organic emulsifier.

In one embodiment of the method, the inorganic nanoparticles are not irreversibly associated with the polymer.

In yet another embodiment, the method further comprises separating the inorganic nanoparticles from the polymer.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term

"a", "an", and "the" are used interchangeably and mean one or more; and

"and/or" is used to indicate one or both stated cases may occur, for example A and/or B includes, (A and B) and (A or B);

"dispersion" refers to polymer particles dispersed in a continuous phase of a different composition, wherein the "continuous phase" refers to a single liquid or a blend of liquids under the polymerization conditions, these liquids may be for example, water or carbon dioxide;

"emulsifier" refers to a substance which stabilizes an emulsion or a suspension by partitioning itself to the interface between the continuous and discontinuous phases and imparting electrostatic, steric, or a combination of these repulsive forces to maintain the total surface area of the interface;

"functional group" means a chemical entity capable of undergoing a chemical reaction, not including polymerization;

"monomer" means chemical species capable of polymerizing, it includes monomers and oligomers; and "organic" has the common meaning in the art, for example, organic compounds are carbon-containing compounds with some exceptions/exclusions including: binary compounds such as carbides, carbon oxides, carbon disulfide; ternary compounds such as metallic cyanides, phosgene, carbonyl sulfide; and metallic carbonates, such as calcium carbonate.

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

The present disclosure relates to the use of inorganic nanoparticles in the polymerization of monomers to form a polymer.

The polymerizable composition of the present disclosure may be used in a suspension or an emulsion polymerization. During and following polymerization, a continuous phase and a dispersed phase exist. In the present disclosure, these phases are maintained by incorporation of an effective amount of inorganic nanoparticles added to the composition. The inorganic nanoparticles stabilize the discontinuous phase, physically preventing adjacent discontinuous phases from contacting each other and coalescing, acting as an inorganic emulsifying agent.

The polymerizable composition of the present disclosure may be substantially free of traditional organic emulsifiers, such as surfactants, detergents, proteins, and other organic compounds that stabilize the dispersion through a reduction in surface tension. Substantially free means that less than 0.1, 0.05, 0.01, or even 0.001% by weight is present relative to the polymerizable monomers.

As used herein, organic emulsifiers include organic compounds that comprise functional groups, which stabilize the dispersion. Such functional groups include, for example, —COO$^-$, —SO$_3^-$, —N(CH$_3$)$_3^-$, and —CH$_2$OH. Exemplary organic emulsifiers include: traditional emulsifiers comprising hydrophobic and hydrophilic segments, such as ammonium octanoate, sodium lauryl sulfate, sodium dodecylbenzene sulfonate, cetyltrimethylammonium chloride, ethoxylated alkyl ethers such as available under the trade designation "TERGITOL 15-S-5" or "TERGITOL 15-S-7" available from Dow Chemical Co., Midland, Mich.; or alkylphenol ether such as available under the trade designation "TRITON X-100" available from Dow Chemical Co. Other exemplary organic emulsifiers include: fluorinated surfactants such as perfluoroalkanoic acids and their salts, as well as polar, water-soluble monomers such as vinyl alcohol or sodium styrene sulfonate.

In one embodiment, polar, water-soluble polymerizable monomers may be used in the polymerization, however their content in the polymerizable composition must be low enough so that these polar, water-soluble monomers do not stabilize the dispersion by themselves. Such low amounts of polar, water-soluble monomer may be less than 5, 2, 1, 0.5, or even 0.1% however, the low amount may vary based on the monomer and the components in the polymerizable composition. To determine if the amount of polar, water-soluble monomers is low enough so that they do not stabilize the dispersion by themselves, identical polymerization reactions may be run with and without inorganic nanoparticles. If a polymerizable composition comprising a given amount of polar, water-soluble monomer and no inorganic nanoparticles does not form a dispersion (in other words, the composition does not comprise any polymer particulate and is: a milky, turbid unpolymerized; a milky, turbid oligomerized system (i.e., comprising less than 20 monomer units in the polymer backbone), or a bi-phasic, agglomerated system), then the given amount of polar, water-soluble monomer is considered to be low enough so as not to stabilize the dispersion by itself.

The resulting dispersion of the present disclosure is typically stable from days to years under ambient temperature. In other words, the composition and microstructure of the dispersion are not changing over time and there is no coalescing of the discontinuous phase. However, some gravitational settling may occur.

The emulsifying agent used in the present disclosure is an inorganic emulsifying agent comprising inorganic nanoparticles. Specifically, the inorganic nanoparticles of the present disclosure may comprise metal oxide nanoparticles. Such metal oxides include, for example, silicon dioxide (silica), zirconia, titania, ceria, alumina, iron oxide, vanadia, antimony oxide, tin oxide, alumina/silica. Although the metal oxide may be essentially pure, it may contain small amounts of stabilizing ion such as ammonium and alkaline metal ions, or it may be a combination of metal oxides such as a combination of titania and zirconia.

The inorganic nanoparticles used in the present disclosure are preferably substantially spherical.

The inorganic nanoparticles have an average diameter of the primary particle of at least 25 nm, 20 nm, 15 nm, 10 nm, 5 nm or even 3 nm; at most about 100 nm, 50 nm, 30 nm, 20 nm, or even 10 nm. The inorganic nanoparticles used in the polymerizable composition of the present disclosure are typically un-aggregated. If the inorganic nanoparticles are an aggregation of primary particles, then the maximum cross-sectional dimension of the aggregated nanoparticle is within the range of range of about 3 nm to about 100 nm, about 3 nm to about 50 nm, about 3 nm to about 20 nm, or even about 3 nm to about 10 nm.

The inorganic nanoparticles as used herein may be distinguished from materials such as fumed silica, pyrogenic silica, precipitated silica, etc. Such silica materials are known to those of skill in the art as being comprised of primary particles that are essentially irreversibly bonded together in the form of aggregates, in the absence of high-shear mixing. These silica materials have an average size greater than 100 nm (e.g., typically of at least 200 nanometers) and from which it is not possible to straightforwardly extract individual primary particles.

In one embodiment, the surface of the inorganic nanoparticle is not modified with organic moieties.

The inorganic nanoparticles may be in the form of a colloidal dispersion. Examples of useful commercially available unmodified silica nanoparticles include commercial colloidal silica sols available from Nalco Chemical Co. (Naperville, Ill.) under the trade designation "NALCO COLLOIDAL SILICAS". For example, such silicas include NALCO products 1040, 1042, 1050, 1060, 2327 and 2329. Examples of useful metal oxide colloidal dispersions include colloidal zirconium oxide, suitable examples of which are described in U.S. Pat. No. 5,037,579 (Matchett), and colloidal titanium oxide, useful examples of which are described in U.S. Pat. No. 6,432,526 (Arney et al.).

Although the emulsifying agent of the present disclosure is referred to as an inorganic emulsifying agent, in one embodiment, the inorganic nanoparticles may comprise surface modification with organic moieties. In one embodiment, the weight of organic moieties on the surface of the inorganic nanoparticle as compared to the weight of the inorganic nanoparticle is less than 50, 40, 30, 25, 20, 10, 5, 1%, or even 0.5%.

The inorganic nanoparticles of the present disclosure are used to stabilize the composition during polymerization and, following polymerization, the polymer is not irreversibly associated (i.e., is reversibly associated) (e.g., is not covalently-bonded) to the inorganic nanoparticle. This means that the inorganic nanoparticles are substantially free (i.e., less than 1, 0.5, 0.1, 0.01, or even 0%) of groups that will copolymerize with the monomers. In one embodiment, the inorganic nanoparticles may comprise polymerizable functional groups, which are not capable of polymerizing by the same polymerization mechanism as the polymerizable monomer in the polymerizable composition.

Exemplary organic moieties, which will not copolymerize with the monomers, that may be used in the surface modification of the inorganic nanoparticle include: alkyl chains and organic moieties comprising functional groups: such as hydrophilic polyethers (e.g., modified polyethylene glycol), quaternary salts, acids (e.g., sulfonic acid, carboxylic acids or phosphonic acid derivates), amines, and combinations thereof.

Useful surface-modifications include, for example, silica nanoparticles surface-modified with surface-modifying agents including, e.g., organotitanates, alcohols, and organosilanes including, e.g., alkyltrichlorosilanes, trialkoxyarylsilanes, trialkoxy(alkyl)silanes, and combinations thereof and zirconia nanoparticles surface modified with organic acids, for example, oleic acid and acrylic acid adsorbed onto the surface of the particle.

Surface modification of nanoparticles is known in the art. For example, silica-based nanoparticles can be treated with monohydric alcohols, polyols, or mixtures thereof (preferably, a saturated primary alcohol) under conditions such that silanol groups on the surface of the nanoparticles chemically bond with hydroxyl groups to produce surface-bonded ester groups. The surface of silica (or other metal oxide) particles can also be treated with organosilanes, e.g., alkyl chlorosilanes, trialkoxy arylsilanes, olefinic silanes, or trialkoxy alkylsilanes, or with other chemical compounds, e.g., organotitanates, which are capable of attaching to the surface of the nanoparticles by a chemical bond (covalent or ionic) or by a strong physical bond, and which are chemically compatible with the chosen reactive monomer(s). Silica-based nanoparticles may be treated with a phase compatibilizing surface treatment agent. Additional surface reagents used to modify the polarity or hydrophobicity of the nanoparticle may be used as well. Representative examples of these reagents include, e.g., isooctyl trimethoxysilane, a product available under the trade designation "BS-1316", from Wacker Silicones (Adrian, Mich.), and phenyl trimethoxysilane, n- octadecyltrimethoxy silane, and 3- aminopropyl trimethoxysilane available from Gelest Inc., Morrisville, Pa., Non-silica metal oxide nanoparticles may be surface treated through adsorption of acidic or basic compounds onto the nanoparticle's surface. The surface treatment agents are preferably chosen to contain functional groups that provide solubility and/or reactivity of the surface modified heavy metal oxide particle with(in) the desired phase. Metal oxide particles such as zirconia may be treated with an acidic compound, such as with carboxylic acids, phosphonic acids, and sulfonic acids or an acidic function derived from oxyacids of boron, carbon, phosphorus, and sulfur.

The inorganic nanoparticle in the polymerizable composition is used in an amount of at least 10 ppm, 50 ppm, 100 ppm, 500 ppm, 1000 ppm, 2000 ppm, 5000 ppm, 7500 ppm, or even 10000 ppm; at most 10000 ppm, 30000 ppm, 50000 ppm, 80000 ppm, or even 100000 ppm when compared to the weight of the total polymerizable composition.

The polymerizable composition comprises an inorganic continuous phase, comprising at least one of water or carbon dioxide, at least one polymerizable monomer and at least one initiator in addition to the inorganic emulsifying agent disclosed herein.

The polymerizable monomer used in the polymerizable composition may be selected from non-fluorinated monomers, fluorinated monomers, or combinations thereof.

Non-fluorinated monomers include those known in the art that are not infinitely miscible with water. Exemplary monomers include: styrene, vinyl chloride, vinyl ester, (meth)acrylate, and an olefin (e.g., ethylene and a propylene). Suitable ethylenically unsaturated monomers include, for example, the (C1-C16)alkyl(meth)acrylates such as (meth)acrylic acid, methyl methacrylate, butyl(meth)acrylate, n-butyl(meth)acrylate, hexyl(meth)acrylate, octyl(meth)acrylate, isooctyl(meth)acrylate, 2-ethylhexyl (meth)acrylate, isobornyl(meth)acrylate, nonyl(meth)acrylate, isononyl (meth)acrylate, decyl(meth)acrylate, propylheptyl(meth)acrylate, dodecyl(lauryl)(meth)acrylate, isodecyl(meth)acrylate, tetradecyl(meth)acrylate; aryl and alkaryl(meth)acrylates such as benzyl(meth)acrylate, nonylphenyl(meth)acrylate, dimethylaminoethyl (meth)acrylate, and, 2-octyl (meth)acrylate; poly(ethylene glycol) acrylates; acrylamides such as dimethyl acrylamide, diisobutyl acrylamide, N-octadecyl acrylamide, and substituted acrylamides; styrenes; and combinations thereof. Other functionalized acrylate monomers can also be used including polyester acrylates, urethane acrylates, and acrylates of epoxidized oils.

Additional polymerizable monomers may be added to the polymerizable composition including, for example, maleimides, N-vinyl azlactones, and monomers containing an epoxide or a vinyl ether functional groups.

Fluorinated monomers include those known in the art that are partially and fully fluorinated. Exemplary polymerizable fluorinated monomers include: fluorinated olefins such as tetrafluoroethylene, chlorotrifluoroethylene, hexafluoropropylene, vinylidene fluoride, and vinyl fluoride; fluorinated ethers such as fluoroallyl ethers, fluoroalkyl vinyl ethers, and fluoroalkoxy vinyl ethers; fluorinated alkoxides such as hexafluoropropylene oxide; fluorinated styrenes, fluorinated siloxanes; and combinations thereof.

Combinations of polymerizable monomers may be used during the polymerization to generate copolymers, such as for example, an acrylate-methacrylate-styrenic copolymer, a tetrafluoroethylene-hexafluoropropylene-vinylidene fluoride copolymer, or an ethylene-tetrafluoroethylene copolymer.

The polymerizable composition of the present disclosure may comprise components capable of cross-linking the resulting polymer, these components which are known in the art include: adding multifunctional monomers, adding cure-site monomers, using chain transfer agents, and/or reacting reactive end groups with nitrogen, Thus, the resulting dispersion may comprise individual dispersed particles with a varying amount of crosslinking within each particle or may comprise particles with curable end groups which are able to be cross-linked in a subsequent cross-linking step. However, to ensure a viable dispersion, the curable end groups of the cure-site monomers should not be polymerized during the polymerization step.

In one embodiment, multifunctional monomers may be added to the polymerizable composition. These multifunctional monomers have functional groups that can react with the living (i.e., growing) polymer to form linked polymers to enable cross-linking of polymer chains. Such multifunctional monomers include: as aliphatic polyalkenyl compounds, aromatic polyalkenyl compounds, and heterocyclic polyalkenyl compounds. Exemplary aliphatic polyalkenyl compounds include: polyvinyl and polyalkyl acetylenes, diacetylenes, and dimethacrylates (e.g., 1,6-hexane diol di(meth)acrylate); and aromatic polyalkenyl compounds include polyvinyl benzene, polyvinyl toluene, polyvinyl xylene, polyvinyl anthracene, polyvinyl naphthalene, and divinyldurene. Exemplary polyvinyl groups include divinyl, trivinyl, and tetravinyl groups. In some embodiments, divinylbenzene (DVB) may be used, and may include o-divinyl benzene, m-divinyl benzene, p-divinyl benzene, and mixtures thereof. Exemplary heterocyclic polyalkenyl compounds include divinyl pyridine, and divinyl thiophene.

In one embodiment, cure-site monomers, which comprise a group capable of participating in a cure reaction may be added to the polymerizable composition. The cure-site monomers may be polymerized into the polymer backbone and facilitate the crosslinking of the polymer in the presence of a catalyst. Such groups capable of participating in a cure reaction include: halogens (such as Br or I) as well as nitrile groups. These cure-site monomers may be polymerized into the polymer backbone and used in subsequent processing to cross-link (or cure) the polymer. Exemplary cure site monomers include: nitrile-containing fluorinated olefins; nitrile-containing fluorinated vinyl ethers; bromine-, chlorine-, and iodine- containing olefins; and bromine-, chlorine- and iodine-containing vinyl ethers. The cure sites may also be introduced via a reaction during polymerization with a chain transfer agent comprising a nitrogen-, bromine, or iodine-containing group. Exemplary chain transfer agents include: $I(CF_2)_nCN$ as described in U.S. Patent No. 6,166,157 (Hung, et al.). Chain transfer agents may also be added to control the molecular weight of the resulting polymer and include, for example, carbon terabromide, alcohols, mecaptans, and mixtures thereof.

Additionally, chain branching agents may be added to the polymerizable composition to generate long chain branching of the polymer as described in U.S. Patent No. 7,375,157 (Amos et al.).

In the present disclosure, an effective amount of at least one initiator may be added to the polymerizable composition to initiate the polymerization reaction. Useful initiators include those that are initiated by radiation (such thermal or UV light) and redox reactions. In one embodiment, the initiator is a water-soluble radical generating initiator.

In photo-initiated radiation systems, the polymerization may be initiated with a compound that decomposes when exposed to light such as ultraviolet light. In thermal-initiated radiation systems, the polymerization may be initiated with a compound that decomposes thermally. Exemplary thermal decomposition initiators include azo compounds (such as 2,2'-azobisisobutyronitrile (AIBN)), disulfides and persulfates. The persulfate may be used on its own without the presence of a reducing agent.

In redox initiator systems, a combination of an oxidizing agent and a reducing agent is used to generate free radicals through a redox reaction. Suitable oxidizing agents include persulfates including for example ammonium persulfate (APS), potassium persulfate (KPS), and sodium persulfate. Suitable reducing agents include sulfites, such as sodium sulfite, sodium bisulfite, a metabisulfite such as sodium or potassium bisulfite, pyrosulfites and thiosulfates, preferably $Na_2S_2O_5$, metal ions such as copper, iron, silver. Another redox based initiation system that can be used includes manganese systems such as those deriving from potassium permanganate, $Mn^{3+}$-salts (like manganese triacetate, manganese oxalate, etc.). A preferred metal salt is $KMnO_4$.

Peroxides may be used in a thermal initiated or a redox initiated system. Exemplary peroxides include: peroxides (such as acyl peroxides, alkyl peroxides, hydrogen peroxides, peroxocarbonates, and peresters such as t-butyl peroxybenzoate).

The amount of initiator employed may be at least 0.01, 0.03, 0.05, 0.1, or even 0.5% by weight; at most 1, 2, 5, or even 10% by weight based on the total weight of the polymerizable composition depending on the initiator selected. The full amount of initiator may be added at the start of the polymerization or the initiator can be added to the polymerization in a continuous way during the polymerization until a conversion of 70 to 80% is achieved. One can also add part of the initiator at the start and the remainder in one or separate additional portions during the polymerization.

The polymerization is conducted within a continuous phase. The continuous phase may be water or carbon dioxide.

In one embodiment, the polymerizable composition comprises at least 20, 30, 40, 50, 75, 80, 90, 95, 98, 99, or even 100% by weight of carbon dioxide based on the total weight of the polymerizable composition.

In one embodiment, the polymerizable composition is an aqueous solution comprising at least 20, 30, 40, 50, 75, 80, 90, 95, 98, 99, or even 100% by weight of water based on the total weight of the polymerizable composition. Solvents including organic liquids may be added to the aqueous solution. Exemplary organic liquids include, acids, alcohols, ketones, aldehydes, amines, amides, esters, glycols, ethers, hydrocarbons, halocarbons, monomers, oligomers, lubricating oils, vegetables oils (including mono- di, and tri-glycerides), silicone oils, moisturizing oils (e.g., mineral and jojoba oils), fuel oils, fuels (including kerosene, gasoline, diesel fuel), oligomers of ethylene glycol, alkyl and aryl nitro compounds, and partially or fully fluorinated compounds may be used.

In one embodiment, the polymerizable composition may comprise auxiliaries, such as buffers and, if desired, complex-formers or chain-transfer agents, including, for example, dialkyl ethers such as dimethyl ether, methyl tertiary butyl ether; chlorine, bromine or iodine containing chain transfer agents; thiols; and mercaptans, such as isooctyl thioglycolate, disulfides, trimethyl silane, and tert-dodecyl mercaptan.

The polymerizable compositions of the present disclosure can include any of the adjuvants commonly employed in curable polymer formulations. An organic or inorganic filler may be added to the composition to improve physical properties, such as tensile strength, density, and modulus. Fillers include: carbon black; silica; or other mineral fillers such as hydrotalcite, or barium sulfate; glass fibers and bubbles; and combinations thereof.

In some embodiments tackifiers and plasticizers may also be added to the composition to increase the bond strength of the polymeric composition in, for example, pressure sensitive adhesives. Tackifiers, include for example, rosin, rosin derivatives, hydrogenated rosin derivatives, polyterpene resins, phenolic resins, coumarone-indene resins, poly-t-butyl styrene and combinations thereof. Plasticizers include for example, hydrocarbon oils, hydrocarbon resins, polyterpenes, rosin esters, phthalates, phosphate esters, dibasic acid esters, fatty acid esters, polyethers, and combinations thereof.

Other optional additives include, for example, stabilizers (e.g., antioxidants or UV- and light stabilizers), anti-microbials, pigments (e.g., dyes), flame retardants, medicaments, blowing agents, and the like. The use of such additives is well known to those of ordinary skill in the art.

The polymerization of the polymerizable composition can be carried out continuously in which, for example, polymerizable monomers, continuous phase, inorganic emulsifier and optionally further buffers and catalysts, etc. are fed continuously to a stirred reactor under optimum pressure and temperature conditions while the resulting emulsion or suspension is removed continuously. An alternative technique is batch or semibatch (semi-continuous) polymerization by feeding the ingredients into a stirred reactor and allowing them to react at a set temperature for a specified length of time or by charging ingredients into the reactor and feeding the monomers into the reactor to maintain a constant pressure until a desired amount of polymer is formed. The polymerization can be carried out in a standard or conventional vessel used for emulsion polymerization of gaseous fluorinated monomers.

The polymerization temperature may range from 10° C., 20° C., 30° C. or even 50° C. to 100° C., 150° C., 175° C., or even 200° C. Polymerization pressures may range from 1, 2, 3 4, 5, 8, or even 10 bar to 20, 25, 30, 35, or even 40 bar. In one embodiment, the polymerization pressures may be greater than 40 bar such as in the case of supercritical continuous phase polymerization.

Dispersions comprising polymeric particles may be achieved by polymerizing the polymerizable composition of the present disclosure. The dispersions may be a suspension polymerization or an emulsion polymerization depending on the conditions and reactants chosen.

The resulting polymerized composition may be coagulated and dried as is known in the art. The resulting polymers may be semicrystalline or amorphrous, depending on the monomers selected.

The resulting polymeric particles in the dispersion have an average particle size of at least 20, 30, 40, 50, 75, 100, 125, 150, 200, or even 250 nm; at most 60, 100, 200, 250, 300, 350, 400, 500, 1000, 3000, 5000, or even 10000 nm (volume average). Generally, after polymerization the particles will be spherical, but rod shaped particles may be present and/or may be present in adamixture with spherical particles. The particle sizes of dispersions can be determined by methods known in the art, including, for example, inelastic light scattering (for example using a Malvern 100 HAS Zetasizer), for example according to DIN ISO 13321 1996(E).

In the present disclosure, the inorganic nanoparticles are reversible associated with the polymeric particles (in other words, they are not covalently bonded). Therefore, in one embodiment, the inorganic nanoparticles may be removed from the polymeric particles.

The resulting polymer dispersion may be used in any application in which dispersions are typically used or the polymer dispersion. The polymer particles may be recovered by methods known in the art (for example, drying, etc.) and further processed (for example, curing of amorphous polymeric particles) to form an article.

In one embodiment, the resulting polymer of the present disclosure may coated (for example by any of a variety of conventional coating techniques known in the art, such as roll coating, spray coating, knife coating, extrusion, die-coating, and the like), formed into a sheet or film (such as a printable film), or molded into a part (such as a hose, o-ring, or gasket).

In one embodiment, the resulting polymer of the present disclosure may used as a coating, a film, a part, an adhesive, or a pressure sensitive adhesive.

In one embodiment, the resulting polymer of the present disclosure may be blended with other materials. For example, the resulting polymer (e.g., poly vinyl chloride resin) may be blended with another polymer (e.g., acrylate solution polymers) to produce a blend, which may then be further processed into an article such as a coating, a film or sheet, or a molded part.

EXAMPLES

Advantages and embodiments of this disclosure are further illustrated by the following examples, but the particular materials and amounts thereof recited in these examples, as well as other conditions and details, should not be construed to unduly limit this disclosure. In these examples, all percentages, proportions and ratios are by weight unless otherwise indicated.

These following abbreviations are used in the examples: nm=nanometer, soln.=solution, g=gram, mL=milliliter, mg=milligram, and L=liter.

Methods

MFI: The melt flow index (MFI), reported in g/10 min, was measured according to ASTM D-1238 at a support weight of 5.0 kg. Unless otherwise noted, a temperature of 265° C. was applied and a standardized extrusion die of 2.1 mm diameter and a length of 8.0 mm was used.

Melting Point: Melting peaks of the fluororesins were determined according to ASTM 4591 by means of Perkin-Elmer DSC 7.0 (PerkinElmer, Wellesley, Mass.) under nitrogen flow and a heating rate of 10° C./min. The indicated melting points relate to the melting peak maximum.

Particle Size: Unless otherwise stated, the latex particle size determination was conducted by means of dynamic light scattering with a Malvern Zetasizer 1000 HSA (Malvern Instruments Inc., Southborough, Mass.) in accordance to ISO/DIS 13321. The reported average particle size is the Z-average. Prior to the measurements, the polymer latexes as yielded from the polymerizations were diluted with 0.001 mol/L KCl-solution, the measurement temperature was 20° C. in all cases.

Materials

All materials are commercially available, for example from Sigma-Aldrich Chemical Company; Milwaukee, Wis., or known to those skilled in the art unless otherwise stated or apparent.

Nanoparticle 1

Silica nanoparticles (5 nm particle size and 16.19% solids, obtained under the trade designation "NALCO 2326" from Nalco Company, Naperville, Ill.) were surface-modified with methoxylated ethylene glycol as follows:

Synthesis of 2-methoxyethanol trimethoxysilane coupling agent: 75 g of 2-methoxyethanol (obtained from Alfa Aesar, Ward Hill, Mass.), 246.2 g isocyanatotrimethoxysilane (obtained from Gelest, Inc., Morrisville, Pa.) and 4 drops of dibutyldilauryltin were combined and stirred overnight. The product was used as follows in the surface modification of nanoparticles.

1000 g silica nanoparticles, 91.65 g 2-methoxyethanol trimethoxysilane coupling agent and 300 g methanol (obtained from VWR, Westchester, Pa.) were combined in a 2L 3-neck round bottom flask equipped with a reflux condenser and a mechanical stirrer. The reaction was carried out at 80° C. overnight with stirring. 400 g of water was added. The methanol was removed via a rotary evaporator. The resulting sol was 15.24% solids by weight and used without further purification.

Nanoparticle 2

NALCO 2326 silica nanoparticles (5 nm particle size, 16.16% solids) obtained from Nalco Company, Naperville, Ill.

Nanoparticle 3

NALCO 2326 silica nanoparticles (5 nm particle size and 16.19% solids) were surface-modified as follows:

500 g silica nanoparticles was combined with 145.6 g N-trimethysilylpropyl-ethylenediamine, triacetic acid trisodium salt (45% solids in water, obtained from Gelest, Inc., Morrisville, Pa.) in a 1L three-neck round bottom flask equipped with a reflux condenser and a mechanical stirrer. The reaction mixture was stirred overnight at 80° C. The resulting sol was 21.47% solids and was used without further purification.

General reaction methods for the polymerization of the non-fluorinated polymers were adapted from *Sorenson, W. R., et al, Preparative Methods of Polymer Chemistry*, Third Ed. John Wiley and Sons, Inc. New York, 2001, p. 250 & 273.

COMPARATIVE EXAMPLE A

Suspension polymerization of styrene with organic emulsifier: Water (125 g), sodium n-dodecylsulfate (0.025 g, Bethesda Research Lab, Gaithersburg, Md.), sodium polyacrylate (0.375 g, 25.25% solution in water, obtained from Sigma-Aldrich Chemical Company; Milwaukee, Wis.), sodium sulfate (1.25 g, obtained from Sigma-Aldrich Chemical Company; Milwaukee, Wis.), styrene (37.5 g, obtained from Alfa Aesar, Wardhill, Mass.), stearic acid (0.375 g, obtained from EMD Chemicals, Gibbstown, N.J.), benzoyl peroxide (0.175 g, Sigma-Aldrich Chemical Company; Milwaukee, Wis.) and hydroxypropylmethylcellulose (1.66 g, sold under the trade designation "METHOCEL J5M S", obtained from Dow Chemical Co., Midland, Mich.) were all added to a 500 mL three-necked flask fitted with an overhead stirrer, $N_2$ inlet, and a condenser. The solution was then degassed under stirring with nitrogen for an hour before it was placed in an oil bath and stirred overnight at 80° C.

EXAMPLE 1

Suspension polymerization of styrene with inorganic emulsifier: Water (125 g), Nanoparticle 1 (0.219 g of 11.4% soln.), sodium polyacrylate (1.49 g of a 25.25% solution in water), sodium sulfate (1.25 g), styrene (37.5 g), benzoyl peroxide (0.175 g), and hydroxypropylmethylcellulose (1.66 g) were all added to a 500 L three-necked flask fitted with an overhead stirrer, $N_2$ inlet, and a condenser. The solution was then degassed under stirring with nitrogen for an hour before it was placed in an oil bath and stirred overnight at 80° C. In this case, no noticeable change in the product was observed when visually compared to Comparative Example A.

COMPARATIVE EXAMPLE B

Emulsion polymerization of styrene with organic emulsifier: Water (100 g), sodium monohydrogen phosphate (0.05 g, MP Biomedicals, Aurora, Ohio), sodium n-dodecylsulfate (1.0 g, Bethesda Research Lab, Gaithersburg, Md.), and potassium persulfate (0.05 g) were added to a brown jar (±250 mL narrow-necked) and nitrogen was bubbled through the water until everything had dissolved. Styrene (50 g) was then added, the mixture was degassed, and the bottle was capped and sealed with polytetrafluoroethylene (PTFE)-thread tape and electrical tape. The bottle was then placed in an oven at 70° C. The reaction was held at 70° C. for two hours with shaking approximately every 10 minutes. The temperature was then raised to 95° C. for two hours with continued shaking

COMPARATIVE EXAMPLE C

Emulsion polymerization of styrene without any emulsifier: Water (100 g), sodium monohydrogen phosphate (0.05 g, MP Biomedicals, Aurora, Ohio), and potassium persulfate (0.05 g, Aldrich, Milwaukee, Wis. were added to a brown jar (±250 mL narrow-necked) and nitrogen was bubbled through the water until everything had dissolved. Styrene (50 g, Aldrich, Milwaukee, Wis.) was then added, the mixture degassed, and the bottle was capped and sealed with PTFE thread tape and electrical tape. The bottle was then placed in an oven at 70° C. The reaction was held at 70° C. for two hours with shaking approximately every 10 minutes. The temperature was then raised to 95° C. for two hours with continued shaking A milky biphasic solution resulted in some linear polymer when crashed into methanol, but no polymeric particles could be discerned.

EXAMPLE 2

Emulsion polymerization of styrene with inorganic emulsifier: Water (100 g), sodium monohydrogen phosphate (0.05 g, MP Biomedicals, Aurora, Ohio), Nanoparticle 1 (8.77 g of 11.4% soln.), and potassium persulfate (0.05 g) were added to a brown jar (±250 mL narrow-necked) and nitrogen was bubbled through the water until everything had dissolved. Styrene (50 g) was then added, the mixture was degassed, and the bottle was capped and sealed with PTFE thread tape and electrical tape. The bottle was then placed in an oven at 70° C. The reaction was held at 70° C. for two hours with shaking approximately every 10 minutes. The temperature was then raised to 95° C. for two hours with continued shaking In this case, no noticeable change in the product was observed when visually compared to Comparative Example B.

EXAMPLE 3

Emulsion Polymerization of styrene with inorganic emulsifier: Water (100 g), sodium monohydrogen phosphate (0.05 g, MP Biomedicals, Aurora, Ohio), Nanoparticle 2 (5.83 g of 17.15% soln.), and potassium persulfate (0.05 g, Aldrich, Milwaukee, Wis.) were added to a brown jar (±250 mL narrow-necked) and nitrogen was bubbled through the water until everything had dissolved. Styrene (50 g) was then added, the mixture was degassed, and the bottle was capped and sealed with PTFE thread tape and electrical tape. The bottle was then placed in an oven at 70° C. The reaction was held at 70° C. for two hours with shaking approximately every 10 minutes. The temperature was then raised to 95° C. for two hours with continued shaking In this case, no noticeable change in the product was observed when visually compared to Comparative Example B.

COMPARATIVE EXAMPLE D

Polymerization of methyl methacrylate with organic emulsifier: The apparatus used was a 500 mL resin kettle that had been fitted with an overhead stirrer, a condenser with a rubber septum and needle to act as a nitrogen outlet a rubber septum on the small joint with a needle to serve as the nitrogen inlet, and a J-KEM temperature controller to read the internal temperature.

Methyl methacrylate (500 g, Alfa, Wardhill, Mass.), aqueous poly(acrylic acid) (10 g of 5% solution, Aldrich, Milwaukee, Wis.), disodium hydrogen phosphate (5.0 g, MP Biomedicals, Aurora, Ohio), water (100 mL), and AIBN (0.624 g, Aldrich, Milwaukee, Wis.) were all added to the apparatus and stirred while the solution was degassed with nitrogen for 25 minutes. The oil bath was then turned on and set to 105° C. in order to bring the reaction mixture to reflux (which began at 81.4° C.). The reaction was stopped when the temperature stayed constant for an hour or longer (84.0° C.).

EXAMPLE 4

Polymerization of methyl methacrylate with surface modified inorganic emulsifier: The apparatus used was a 500 mL resin kettle that had been fitted with an overhead stirrer, a condenser with a rubber septum and needle to act as a nitrogen outlet a rubber septum on the small joint with a needle to serve as the nitrogen inlet, and a J-KEM temperature controller to read the internal temperature.

Methyl methacrylate (500 g, Alfa, Wardhill, Mass.), Nanoparticle 1 (4.39 g of an 11.4% solution), disodium hydrogen phosphate (5.0 g MP Biomedicals, Aurora, Ohio), water (100 mL), and AIBN (0.624 g, Aldrich, Milwaukee, Wis.) were all added to the apparatus and stirred while the solution was degassed with nitrogen for 25 minutes.

The oil bath was then turned on and set to 105° C. in order to bring the reaction mixture to reflux (which began at 81.4° C.). The reaction was stopped when the temperature stayed constant for an hour or longer (83.8° C.). In this case, no noticeable change in the product was observed when visually compared to Comparative Example D.

EXAMPLE 5

Polymerization of methyl methacrylate with inorganic emulsifier: The apparatus used was a 500 mL resin kettle that had been fitted with an overhead stirrer, a condenser with a rubber septum and needle to act as a nitrogen outlet a rubber septum on the small joint with a needle to serve as the nitrogen inlet, and a J-KEM temperature controller to road the internal temperature.

Methyl methacrylate (500 g, Alfa, Wardhill, Mass.), Nanoparticle 2 (2.85 g of an 17.5% solution), disodium hydrogen phosphate (5.0 g, MP Biomedicals, Aurora, Ohio), water (100 mL), and AIBN (0.624 g, Aldrich, Milwaukee, Wis.) were all added to the apparatus and stirred while the solution was degassed with nitrogen for 25 minutes.

The oil bath was then turned on and set to 105° C. in order to bring the reaction mixture to reflux (which began at 81.4° C.). The reaction was stopped when the temperature stayed constant for an hour or longer (73.6° C. for the control). The particle size in this polymerization was noticeably smaller than Comparative Example D.

EXAMPLE 6

Emulsion polymerization using an inorganic emulsifier: An aqueous phase was prepared by combining 360 g deionized water, 17.6 g acrylic acid, 27.8 g Nanoparticle 2 (27.8 g), and disodium phosphate monohydrate (7.0 g). A monomer phase composed of isooctyl acrylate (405 g, obtained from Sigma-Aldrich Chemical Company; Milwaukee, Wis.), styrene (4.4 g), methyl methacrylate (13.2 g), and carbon tetrabromide (0.184 g, obtained from Sigma-Aldrich Chemical Company; Milwaukee, Wis.) was prepared in another jar, and the two phases were poured into a 2 L flask. To the flask was added sodium dedecylbenzene sulfonate solid (4.4 g). The solution was heated to 33° C. and degassed with nitrogen at an agitation rate of 400 rpm. To the flask was added ferrous sulfate (2.6 mg, obtained from Sigma-Aldrich Chemical Company; Milwaukee, Wis.), potassium persulfate (882 mg, obtained from Sigma-Aldrich Chemical Company; Milwaukee, Wis.), and sodium metabisulfite (220 mg, obtained from Sigma-Aldrich Chemical Company; Milwaukee, Wis.). The temperature was gradually increased (–5° C.) to 60° C. over a period of 75 min. The reaction generated an exotherm, reaching a peak temperature of 85° C., before it was cured for 1 h at 80° C. The mixture was cooled and drained, yielding an emulsion adhesive at 55.5% solids. The particle size was measured with a particle size analyzer (sold under the trade designation "COULTER N4M" (obtained from Beckman Coulter, Inc., Brea, Calif.) giving a mean diameter of 1000 nm.

EXAMPLE 7

Suspension polymerization using an inorganic emulsifier: To a 2 L flask was added deionized water (691 g), vinyl acetate (259 g, obtained from Sigma-Aldrich Chemical Company; Milwaukee, Wis.), disodium phosphate monohydrate (2.98 g), and Nanoparticle 2 (16.39 g). The mixture was stirred at 350 rpm, and VAZO 52 (2.59 g, obtained form DuPont, Wilmington Del.) was added. The contents were agitated 30 min, then heated to 40° C. while purging with nitrogen. After 90 min at 40° C., the temperature was increased to 50° C., and the held for 3.5 h. The contents of the flask were filtered in a Buchner funnel and washed with deionized water, yielding vinyl acetate beads that ranged from 70 to 250 micrometers in diameter.

EXAMPLE 8

Polymerization of a fluorinated terpolymer using surface modified inorganic emulsifier: A 50 liter volume stainless steel reactor equipped with a stirrer working at 240 rpm was filled with 29 liters deionized water. To the water 2.0 g of Nanoparticle 1, a solution of 0.0365 g $CuSO_4*5H_2O$ in 7.5 g $NH_4OH$ (25%) and 200 g NaOH (10%) was added. After degassing the system, the reactor was heated to 70° C. and ethane was introduced to reach 0.47 bar, followed by additional 2 bar TFE (tetrafluoroethylene), additional 6.4 bar HFP (hexafluoropropylene), and 5.2 bar VDF (vinylidene fluoride). Polymerization was started by adding 36.0 g of the polymerization initiator ammonium peroxodisulfate (APS), dissolved in 200 ml deionized water and 6.0 g $Na_2S_2O_5$ in 100 ml deionized water. The pressure was kept constant by feeding TFE and additional HFP and VDF in a ratio of 1: 0.455:0.855. Having reached a total amount of 3.5 kg TFE the polymerization was stopped, by closing the monomer feed and the reactor was vented. The dispersion with solids content of 21.9% was discharged. The polymer had the following characteristics: Particle Size=364 nm, Melting Point=107° C., and MFI (265° C./5 kg/2,095 mm)=6.7 g/10 min, using the methods described above.

EXAMPLE 9

Polymerization of a fluorinated terpolymer using surface modified inorganic emulsifier: A 50 liter volume stainless steel reactor equipped with a stirrer working at 240 rpm was filled with 29 liters deionized water. To the water 2.0 g of Nanoparticle 3, a solution of 0.0365 g $CuSO_4*5H_2O$ in 7.5 g $NH_4OH$ (25%) and 200 g NaOH (10%) were added. After degassing the system the reactor was heated to 70° C. and ethane was introduced to reach 0.47 bar, followed by additional 2 bar TFE, additional 6.4 bar HFP and 5.2 bar VDF. Polymerization was started by adding 36.0 g of the polymerization initiator ammonium peroxodisulfate, dissolved in 200 ml DI water and 6.0 g $Na_2S_2O_5$ in 100 ml DI water. The pressure was kept constant by feeding TFE and additional HFP and VDF in a ratio of 1:0.455:0.855. Having reached a total amount of 3.5 kg TFE the polymerization was stopped, by closing the monomer feed and the reactor was vented. The dispersion with solids content of 21.7% was discharged. The polymer had the following characteristics: Particle Size=260 nm, Melting Point=106° C., and MFI (265° C./5 kg/2,095 mm)=2.8 g/10 min, using the methods described above.

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. A polymerizable composition comprising:
    an aqueous continuous phase;
    more than 0 and at most 20,000 ppm of inorganic nanoparticles compared to the weight of the polymerizable composition, wherein the inorganic nanoparticles have an average diameter of less than 100 nm and the inorganic nanoparticles comprise a surface modification with organic moieties, wherein the organic moieties are covalently bonded to the surface of the inorganic nanoparticles, and wherein the inorganic nanoparticle is not a fumed silica, a pyrogenic silica, or a precipitated silica;
    a discontinuous phase comprising a polymerizable monomer, wherein the polymerizable monomer is at least one of tetrafluoroethylene, hexafluoropropylene, fully fluorinated vinyl/allylether, and combinations thereof; and
    an initiator,
    wherein the polymerizable composition is substantially free of an organic emulsifier and wherein the inorganic nanoparticles are substantially free of groups that will copolymerize with the polymerizable monomer.

2. The polymerizable composition according to claim 1, wherein the surface of the inorganic nanoparticles is modified with at least one of: an alkyl chain, a hydrophilic polyether, a quaternary salt, an amine, an acid, and combinations thereof.

3. The polymerizable composition according to claim 1, wherein the inorganic nanoparticles are dispersed in the aqueous continuous phase.

4. The polymerizable composition according to claim 1, wherein the aqueous continuous phase comprises at least 20% by weight based on the total weight of the polymerizable composition.

5. The polymerizable composition according to claim 1, wherein the organic moieties are organosilanes comprising at least one of: alkyl chains, hydrophilic polyethers, quaternary salts, amines, acids, and combinations thereof.

6. The polymerizable composition according to claim 1, wherein the amount of inorganic nanoparticles is less than 10,000 ppm when compared to the weight of the total polymerizable composition.

7. The polymerizable composition according to claim 1, wherein the initiator comprises a redox initiator system.

8. The polymerizable composition according to claim 1, wherein the initiator comprises a peroxide.

9. The polymerizable composition according to claim 1, wherein the initiator comprises at least one of a disulfide, or a persulfate.

10. A method comprising: polymerizing a composition to form a polymer, the composition comprising a discontinuous phase comprising a polymerizable monomer, wherein the polymerizable monomer is at least one of tetrafluoroethylene, hexafluoropropylene, fully fluorinated vinyl/allylether, and combinations thereof, an aqueous continuous phase, an initiator, and inorganic nanoparticles, wherein the inorganic nanoparticles have an average diameter of less than 100 nm and the inorganic nanoparticles comprise a surface modification with organic moieties, wherein the organic moieties are covalently bonded to the surface of the inorganic nanoparticles, wherein the inorganic nanoparticles are substantially free of polymerizable functional groups and wherein the composition is substantially free of an organic emulsifier, and wherein the inorganic nanoparticle is not a fumed silica, a pyrogenic silica, or a precipitated silica and wherein the amount of inorganic nanoparticles is at most 20,000 ppm when compared to the weight of the polymerizable composition, wherein the initial composition is free of the polymer.

11. The method of claim 10, wherein the inorganic nanoparticles are not irreversibly associated with the polymer.

12. The method of claim 10, further comprising separating the inorganic nanoparticles from the polymer.

13. The method according to claim 10, wherein the polymerizing step occurs in a suspension.

* * * * *